(12) United States Patent
Arque Saleta

(10) Patent No.: US 10,245,824 B2
(45) Date of Patent: Apr. 2, 2019

(54) METHOD FOR DECORATING THE SIDES OF PLASTIC CARDS

(71) Applicant: SMART LAYER 3, S.L., Barcelona (ES)

(72) Inventor: Albert Arque Saleta, Barcelona (ES)

(73) Assignee: Smart Layer 3, S.L., Barcelona (ES)

( * ) Notice: Subject to any disclaimer, the term of this patent is extended or adjusted under 35 U.S.C. 154(b) by 0 days.

(21) Appl. No.: 16/059,187

(22) Filed: Aug. 9, 2018

(65) Prior Publication Data

US 2018/0345655 A1    Dec. 6, 2018

Related U.S. Application Data

(62) Division of application No. 14/651,786, filed as application No. PCT/ES2014/070632 on Aug. 1, 2014.

(30) Foreign Application Priority Data

Aug. 6, 2013    (ES) .................................. 201331233

(51) Int. Cl.
*B41F 19/02*    (2006.01)
*B44C 1/17*    (2006.01)
(Continued)

(52) U.S. Cl.
CPC ............ *B41F 19/02* (2013.01); *B41F 16/008* (2013.01); *B41F 19/06* (2013.01); *B41F 19/062* (2013.01);
(Continued)

(58) Field of Classification Search
CPC ...... B42D 15/02; B42D 25/405; B42D 25/41; B42D 25/45; B42D 2033/20;
(Continued)

(56) References Cited

U.S. PATENT DOCUMENTS

| 6,361,640 B1* | 3/2002 | Kamen ................ B44C 1/1729 118/211 |
| 2006/0073299 A1* | 4/2006 | Killey .................... B42D 5/003 428/40.1 |
| 2014/0224880 A1* | 8/2014 | Launay .................... B41M 3/00 235/487 |

FOREIGN PATENT DOCUMENTS

| CA | 2 260 551 A1 | 8/1999 |
| EP | 2 213 475 A2 | 8/2010 |

(Continued)

OTHER PUBLICATIONS

WIPO, European Patent Office (ISA), International Search Report, dated Mar. 18, 2015.

(Continued)

*Primary Examiner* — Leslie J Evanisko
(74) *Attorney, Agent, or Firm* — Thedford I. Hitaffer; Hitaffer & Hitaffer, PLLC

(57) ABSTRACT

Engraver configured to be coupled to a heater piece of a hot foil stamping machine for decorating sides of plastic cards wherein the engraver is made of silicone and capable of being heated up and comprising a recess on its external face opposite to a foil of the hot foil stamping machine, in such a way that a cross-section of said engraver is a negative shape and size of a side of plastic cards, including rounded corners formed by said side and adjacent side, wherein engraver size is dependent on number of plastic cards and the engraver is capable of being heated up and is suitable for being coupled to the heater head piece of the hot foil stamping machine.

3 Claims, 4 Drawing Sheets

(51) Int. Cl.
  *G06K 19/00*  (2006.01)
  *B41F 16/00*  (2006.01)
  *B41F 19/06*  (2006.01)
  *B42D 25/40*  (2014.01)
  *B42D 25/00*  (2014.01)
(52) U.S. Cl.
  CPC ............ *B41F 19/064* (2013.01); *B42D 25/00*
      (2014.10); *B42D 25/40* (2014.10); *B44C*
      *1/1729* (2013.01); *G06K 19/00* (2013.01)
(58) Field of Classification Search
  CPC ............ B42D 2035/34; B42D 2035/44; B42D
      2035/50; B41F 19/02; B41F 19/062;
      B41F 19/064; B41F 19/06; B41F 16/008;
      B41F 17/02; B41F 17/16; B44C 1/1729
  See application file for complete search history.

(56) References Cited

FOREIGN PATENT DOCUMENTS

| | | |
|---|---|---|
| GB | 2 475 981 A2 | 6/2011 |
| JP | HIO 58871 A | 3/1998 |
| JP | 2010 044683 A | 2/2010 |
| WO | WO 00/12442 A1 | 3/2000 |

OTHER PUBLICATIONS

WIPO, European Patent Office (ISA), Written Opinion, dated Mar. 18, 2015.

\* cited by examiner

METHOD FOR DECORATING THE SIDES OF PLASTIC CARDS

CROSS-REFERENCE TO RELATED APPLICATIONS

This application is a divisional of U.S. patent application Ser. No. 14/651,786 filed Jun. 12, 2015, which is a Nation Phase of International Application No. PCT/ES2014/070632 filed Aug. 1, 2014, which claims priority from ES Patent Application No. P201331233 filed Aug. 6, 2013, the disclosures of which are incorporated herein by reference.

OBJECT OF THE INVENTION

The object of the present invention is an innovative method for decorating the sides of plastic cards, by means of hot foil stamping, in addition to the engraver to be coupled to the heater head piece of the hot foil stamping machine, used to carry out the former method and the plastic cards, the sides of which have been decorated by means of the decoration process, using the engraver designed to carry out said method.

BACKGROUND OF THE INVENTION

Plastic cards used for a multitude of purposes are well known in the state of the art, the most well-known including payment by debit or credit card, credit cards or identification for buildings or various kinds of events. The frontal and rear faces of these plastic cards are usually decorated with all kinds of motifs, which usually constitute advertising and, on many occasions, contain some or all of the information required in order for them to fulfil their objective within this decoration, for example the name of the card holder.

One aesthetic requirement of decorated plastic cards is that their sides are the same color as their frontal and rear faces or other kinds of decoration wished to be incorporated.

In order to ensure that the sides of cards are the desired color, cards made of plastic of the desired color are used. This solution requires manufacturers to maintain stock in each one of the colors offered, therefore meaning the cost of maintaining this stock is very high. Furthermore, since storing cards in all colors is very costly, it is highly likely that they will lose out on sales opportunities simply because they don't have the color a client desires at any particular time.

The invention object of the present description offers a decoration technique, unpublished to date, for decorating the sides of plastic cards by means of the well-known hot foil stamping decoration method, the characteristics of this method making it possible to lower production and stock maintenance costs, thereby possibly meaning just one color of card needs to be stocked, which is usually white.

The hot foil stamping method consists of applying a certain amount of pressure using an engraver, during a certain period of time at a certain temperature, to a piece of foil located on the surface to be decorated.

The surface where the engraver comes into contact with the foil may be completely flat or have a relief of the symbol to be decorated engraved onto it. After hot stamping, it is possible to clean the foil traces by means of the blowing, brushing or transfer process, in order to eliminate the traces of foil that may be left behind.

Hot foil stamping is carried out, amongst other things, in vertical stamping machines and roll-on stamping machines.

Vertical hot stamping machines constitute vertical presses, the mobile body of which is an arm, which moves up and down alternately, there being a heater head piece at the end of said arm, to which an engraver that may be heated up is coupled, in addition to a support or wedge, which positions and holds the pieces to be stamped, as well as various feeder, transportation and placement devices for the foil and devices for controlling pressure, stamping time and the temperature at which the engraver is to be heated.

In roll-on stamping machines, the heater head piece is a cylinder that rotates on its own axis, to which the engraver that may be heated up is coupled on the external cylindrical surface thereof, this kind of machine being used to carry out large series stamping.

Hot stamping foil is formed by various layers that are deposited on a polyester support. In order, these layers include: polyester, a coating layer, a protective layer, a decorative layer or layers or color/aluminum layer and an adhesive layer, applied with heat and pressure.

It is applied using heat and pressure on the surface to be decorated, the relief with which the engraver is formed constituting the element that comes into physical contact with the foil, which is transferred to the surface.

DESCRIPTION OF THE INVENTION

The method for decorating the sides of plastic cards object of the present invention comprises the following steps:
a. Placing a plurality, preferably 25 units, of plastic cards on a first support wedge, in such a way that the first, shortest side of said plastic cards is opposite the engraver.
b. Hot foil stamping the first shortest sides of the plastic cards.
c. Blowing air onto the stamping applied to the first shortest sides.
d. Placing a plurality of plastic cards on a first support wedge, such that the second shorter side of said plastic cards is opposite the engraver.
e. Hot foil stamping the second shortest sides of the plastic cards.
f. Blowing air onto the stamping applied to the second longest sides.
g. Placing a plurality of plastic cards on a second support wedge, in such a way that the first longest side of said plastic cards is opposite the engraver.
h. Hot foil stamping the first longest sides of the plastic cards.
i. Blowing air onto the stamping applied to the first longest sides.
j. Placing a plurality of plastic cards on a second support wedge, in such a way that the second longest side of said plastic cards is opposite the engraver.
k. Hot stamping the second longest sides of the plastic cards.
l. Blowing air onto the stamping applied to the second longest sides, in order to eliminate over-press left behind from the hot stamping method.

Please note that the term "engraver" used in this text means a stamping or printing element that functions to apply color or indicia by hot stamping upon a substrate.

In order to carry out the above described process, a hot foil stamping machine of the vertical or roll-on variety described above is used, to which an engraver that may be heated up is coupled on the heater head piece, said engraver being made from silicone, the external face thereof opposite the foil having a recess, such that the shape of a cross-section of said engraver is the negative shape and the same size as a side of said card, including the rounded corners formed by said side with the adjacent sides of the card. Said vertical hot foil stamping machine also comprises one or more wedges, suitable for positioning and holding the plastic cards in such a way that the sides to be decorated are opposite the lower face of the engraver, it being possible for said wedges to be holding devices that facilitate the use of the same wedge to hot stamp all four sides of the cards.

The cross-section of the engraver is preferably the same shape and size as the first and second longest side of the plastic cards and in another preferred embodiment, is the same shape and size as the first and second shortest side of said plastic cards.

The engraver is preferably made of 80° Shore A silicone.

The card stamped with hot foil according to the method described in the paragraphs above, using the hot stamping machine, the sides of which are hot stamped with foil, also forms the object of the present invention.

LIST OF REFERENCES

Figure 1:
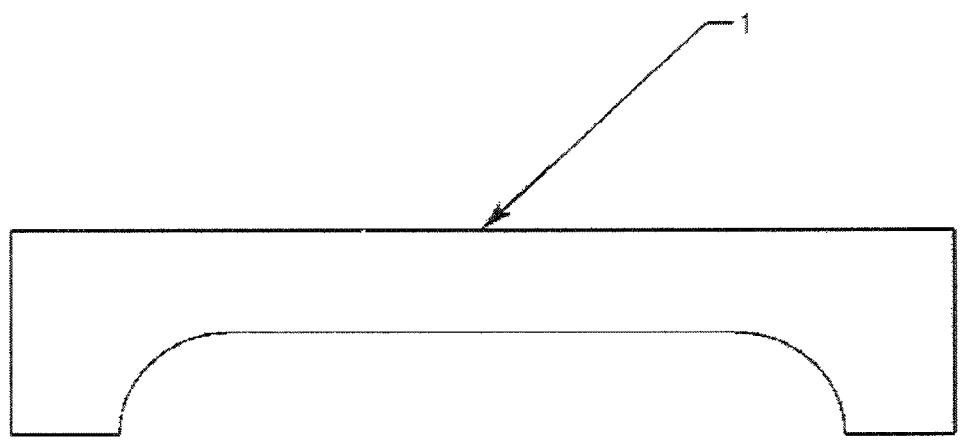
FIG. 1: is a cross-section of the controlled temperature engraver.
Figure 2:
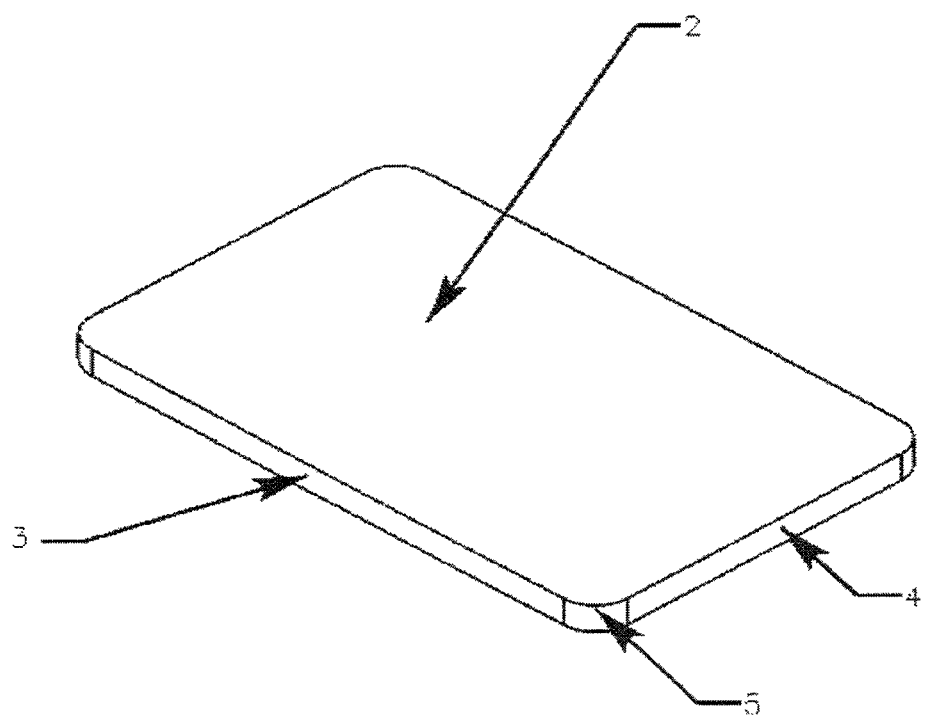
FIG. 2: is a perspective view of a detail of a plastic card, showing the sides thereof.
Figure 3:
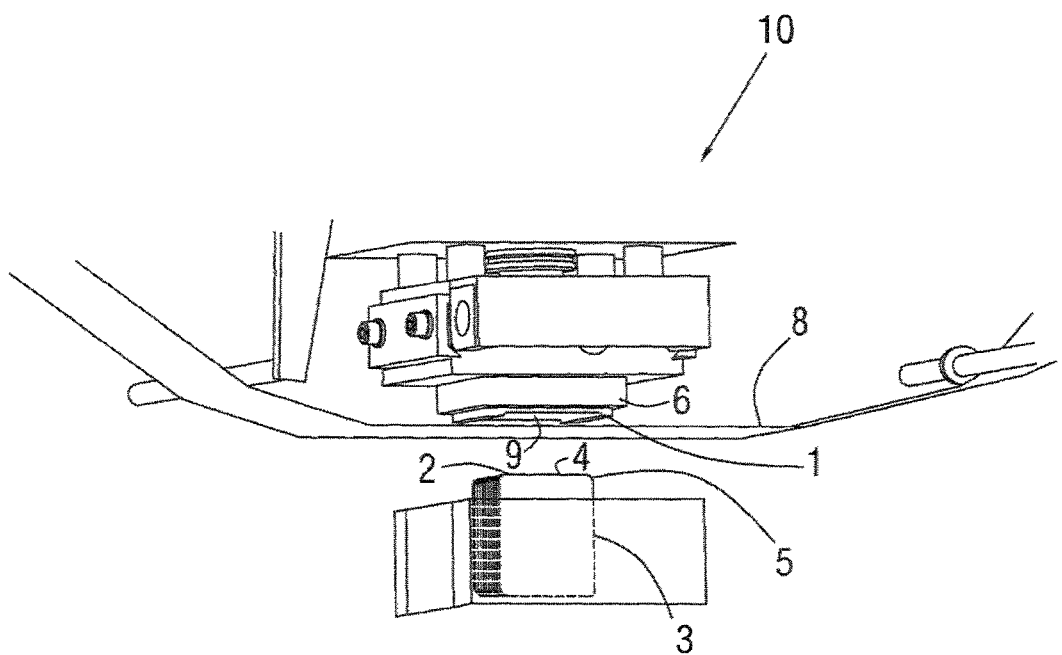
FIG. 3: is perspective view of a vertical hot foil stamping machine with the engraver coupled to a heater head piece of said vertical hot foil stamping machine.
Figure 4:
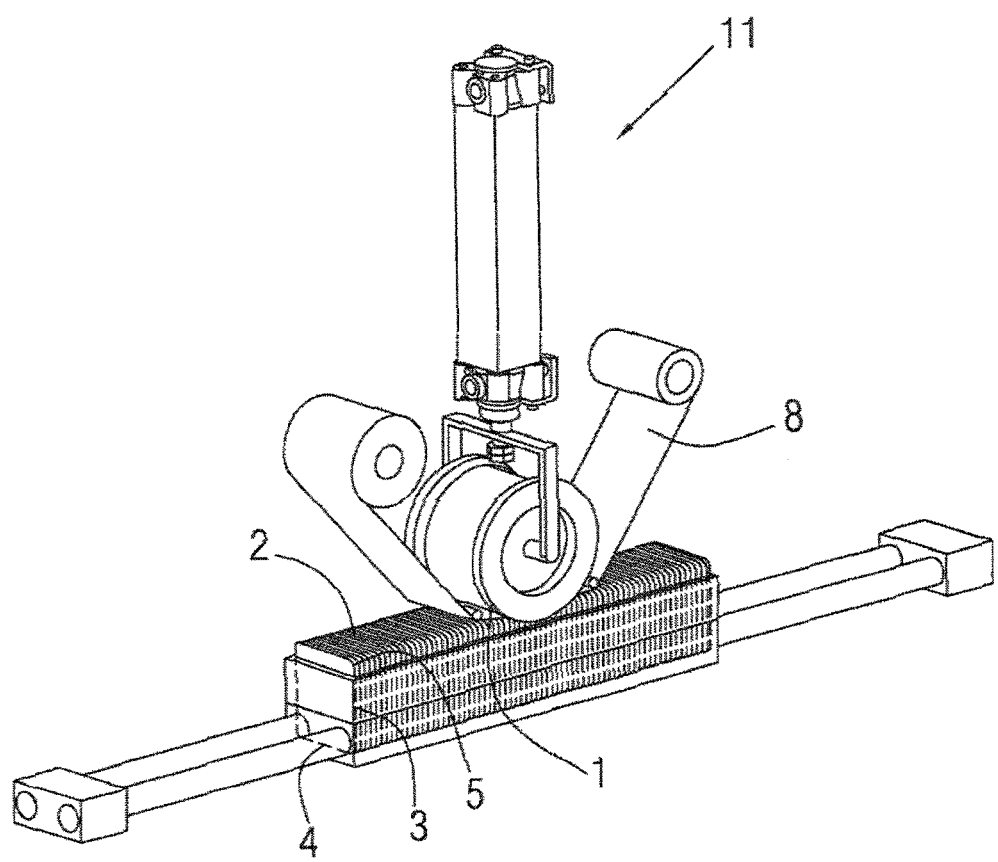
FIG. 4: is a perspective view of a roll-on hot foil stamping machine with the engraver coupled to a heater head piece of said roll-on hot foil stamping machine.

1. Engraver
2. Plastic card
3. Longest side
4. Shortest side
5. Rounded corner
6. Heater head piece
8. Foil
9. Negative
10. Vertical hot foil stamping machine
11. Roll-on hot foil stamping machine.

PREFERRED EMBODIMENT OF THE INVENTION

In a preferred embodiment of the invention, the plastic cards comply with ISO 7816 and the measurements thereof are:

Length: 85.6+1/−0.5 mm
Width: 53.98+/−0.2 mm
Nominal depth: 0.762 mm
and groups of 25 cards are preferably worked with.

The method uses hot foil stamping machines that are either vertical or roll-on, with the engraver and the wedge described previously; the production chain may consist of:

Four hot stamping machines, each of which is followed by its corresponding blowing station. In this production chain, each hot stamping machine stamps one side.

Two hot stamping machines followed by their corresponding blowing stations, each one of the hot stamping machines stamping two sides.

One hot stamping machine followed by a blowing station.

What is claimed is:

1. A method for decorating sides of plastic cards by hot foil stamping, the method comprising the following steps:
   a. placing a plurality of plastic cards on a support wedge, such that first sides of said plastic cards are opposite an engraver,
   b. hot foil stamping, via the engraver, the first sides of the plastic cards and including round corners formed by said first sides with adjacent sides of the cards,
   c. blowing air on the hot foil stamping applied to the first sides,
   d. placing the plurality of plastic cards on the support wedge such that second sides of said plastic cards are opposite the engraver,
   e. hot foil stamping, via the engraver, the second sides of the plastic cards and including round corners formed by said second sides with adjacent sides of the cards,
   f. blowing air on the hot foil stamping applied to the second sides,
   g. placing the plurality of plastic cards on the support wedge, such that a third side of said plastic cards are opposite the engraver,
   h. hot foil stamping, via the engraver, the third sides of the plastic cards and including round corners formed by said third sides with adjacent sides of the cards,
   i. blowing air on the hot foil stamping applied to the third sides,
   j. placing the plurality of plastic cards on the support wedge, such that fourth sides of said plastic cards are opposite the engraver,
   k. hot foil stamping, via the engraver, the fourth sides of the plastic cards and including round corners formed by said fourth sides with adjacent sides of the cards, and
   l. blowing air on the hot foil stamping applied to the fourth sides.

2. The method for decorating the sides of plastic cards according to claim 1, wherein the plurality of cards comprises of 25 cards.

3. The method for decorating the sides of plastic cards according to claim 1, wherein a same wedge is used to hot stamp all four sides of said plastic cards.

* * * * *